United States Patent
Hayakawa

(10) Patent No.: US 6,708,042 B1
(45) Date of Patent: Mar. 16, 2004

(54) COMMUNICATION METHOD AND COMMUNICATION SYSTEM

(75) Inventor: Tadashi Hayakawa, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/473,949

(22) Filed: Dec. 29, 1999

(51) Int. Cl.⁷ ................................................. H04Q 7/20
(52) U.S. Cl. .................... 455/522; 455/69; 455/425; 370/252; 370/265
(58) Field of Search .................. 455/522, 69, 422.1, 455/426.1, 88, 435.1, 440, 453, 425, 67.11, 68, 426.2; 370/252, 465; 375/297

(56) References Cited

U.S. PATENT DOCUMENTS

| | | | | |
|---|---|---|---|---|
| 5,732,347 A | * | 3/1998 | Bartle et al. ................. | 455/421 |
| 5,787,079 A | * | 7/1998 | Bateman et al. ............ | 370/343 |
| 5,794,157 A | * | 8/1998 | Haartsen ...................... | 455/522 |
| 5,914,950 A | * | 6/1999 | Tiedemann et al. ......... | 370/348 |
| 5,982,813 A | * | 11/1999 | Dutta et al. .................. | 375/219 |
| 6,035,210 A | * | 3/2000 | Endo et al. .................. | 455/522 |
| 6,072,990 A | * | 6/2000 | Agrawal et al. .............. | 455/69 |
| 6,167,282 A | * | 12/2000 | Hunsberger .................. | 455/513 |

FOREIGN PATENT DOCUMENTS

JP          9-326753          12/1997

* cited by examiner

Primary Examiner—Sinh Tran
Assistant Examiner—Kamran Afshar
(74) Attorney, Agent, or Firm—McDermott, Will & Emery

(57) ABSTRACT

The present invention provides a communication system and a communication method, whereby a communication status in wireless communications can be arbitrarily designated at the mobile station side, thereby enabling the optimization of communication costs according to the communication status, the structure of the communication system including a mobile station 20 and a base station 30. The mobile station 20 comprises a controller 21, antenna 24, receiving circuit 22, transmitting circuit 23, input device 26 that allows the user 10 to input information and display panel 25 to display information and the like, and the base station 30 comprises a controller 31, antenna 34, receiving circuit 32, transmitting circuit 33 and charge calculating device 41. The use 10 is allowed to set up a communication status arbitrarily via the input device 26, thereby enabling the optimization of communication costs according to the communication status.

19 Claims, 6 Drawing Sheets

COMMUNICATION METHOD AND COMMUNICATION SYSTEM

BACKGROUND OF THE INVENTION

The present invention relates to a communication method and a communication system for performing transmitting/receiving of signals between a base station and a plurality of mobile stations by wireless propagation, and particularly relates to a communication method and a communication system that enable the mobile station side to designate conditions of communications such as transmitting power, communication quality and the like when signals are transmitted.

In a large scale communication system, a service area has been heretofore formed of a plurality of wireless zones. Each respective wireless zone has a base station equipped with a transmitter and a receiver and communicates bidirectionally with a plurality of mobile stations, each equipped with a transmitter and a receiver, through wireless communication channels.

FIG. 8 is a schematic diagram showing a wireless zone according to a prior art communication system. In FIG. 8, a base station 1 acting as a relay station for communications and the like is set up in a wireless zone 3, where mobile stations 51, 52, . . . , 5n such as portable telephones and the like for wireless communications with the base station 1 are located. The base station 1 is performing wireless communications with the mobile stations 51, 52, . . . , 5n with predetermined levels of transmitting power 61, . . . , 6n and the communication area to be covered by the base station 1 is indicated by the wireless zone 3. When wireless communications are performed between the base station 1 and a plurality of the mobile stations 51, 52, . . . , 5n, respectively as FIG. 8 shows, transmitting power of signals has a great influence on communication quality. Therefore, many methods for controlling transmitting power have been adopted heretofore. A description is given to a prior art communication system employing a method of controlling transmitting power on the following.

The prior art communication system has transmitting frequencies for signals in wireless communications assigned to respective mobile stations 51, . . . , 5n that are different from one another, and also transmitting powers 61, . . . , 6n of signals between the base station 1 and the mobile stations 51, . . . , 5n are set up in such a way that the mobile station located the farthest from the base station 1 (the mobile station 5n located on the boundary of the wireless zone 3 in FIG. 8) is allowed to communicate with the base station 1, and transmitting powers of all the mobile stations 51, 5n are made the same. Therefore, as the distance between the base station 1 and the respective mobile stations 51, . . . , 5n becomes the smaller, the signal power level (signal energy level) of the received signal becomes the higher.

According to the prior art communication system as described in the above, as long as the mobile stations 51, . . . , 5n are located within the wireless zone 3 of the base station 1, it is made possible for wireless communications to be performed between the base station 1 and the respective mobile stations 51, . . . , 5n.

Other prior art communication systems such as a spread spectrum communication system and the like use the same frequency as the signal propagating wave frequency in wireless communications throughout all the mobile stations 51, . . . , 5n. Also, transmitting powers 61, . . . , 6n of signals between the base station 1 and the respective mobile stations 51, . . . , 5n are made different for each respective mobile station in order to have the signal power level of a signal received by the base station 1 from each of the mobile stations 51, . . . , 5n made the same with one another. In other words, transmitting power of a signal between the base station 1 and any one of the mobile stations 51, . . . , 5n is made proportionate to the distance between the base station 1 and the above one of the mobile stations 51, . . . , 5n, thereby making it possible for the signal power level of a signal received by the base station 1 from any one of the mobile stations 51, . . . , 5n to be the same with one another.

Accordingly, the prior art communication systems allow wireless communications to be performed among a plurality of mobile stations 51, . . . , 5n by using the same frequency as the signal propagating wave frequency for all the mobile stations 51, . . . , 5n.

A method for controlling transmitting power levels of signals in a communication system by assigning the same frequency to the propagating wave frequency for all the signals as described in the above is disclosed in a Japanese Patent Unexamined Publication numbered H9-326753. This method for controlling transmitting power levels allows a transmitting power level to be controlled up and down within a predetermined range according to the quality of received signals and also allows the charge management office to be informed of the intensity of received signals.

However, the prior art communication systems and the method for controlling transmitting power levels as disclosed by the Japanese Patent Unexamined Publication H9-326753 have a problem of inability to set up the transmitting power level, quality of communications and the like arbitrarily at the mobile station side. Therefore, in case where the information transmitted via wireless communications happens to be a computer program and the like, for example, the mobile station side (user side) has not been allowed to designate the conditions of wireless communications as needed according to the information to be transmitted as in the case where transmitting power, quality of communications and the like are to be enhanced when such information as a computer program add the like is transmitted via wireless communications and to be degraded when such information as voice data and the like is transmitted, for example.

In addition, in order to guarantee a high grade in communication quality, a transmitting power level exceeding a predetermined level has been maintained throughout a specific wireless zone, thereby keeping a given level of communication quality regardless the nature of information to be transmitted. In general, a transmitting power level is closely related to the level of fee charged to a mobile station (user) and for a certain user who is just involved with a voice data it may be ending up with a higher communication quality level than what is really needed, thereby causing sometimes a problem of bringing about an inappropriately high communication cost. On the other hand, with a communication system where the transmitting power level is set to an inadvertently low level, such provisions as sending the same data several times to ascertain the agreement of received data and the like, for example, are put in place in order to maintain a given level in communication quality for such information as a computer program and the like, thereby creating a problem of increasing communication costs due to prolonged communication time.

SUMMARY

The present invention deals with the problems as described in the above and the objective thereof is to provide a communication method and communication system that enable the establishment of the best conditions for communications according to the nature of information to be transferred and the communication environment by designating as needed at the mobile station side such conditions for wireless communications as a transmitting power level, a value of communication quality and the like.

The present invention also aims at providing a communication method and communication system to allow the communication fees to be determined according to the conditions of communications designated at the mobile station side in consideration of the nature of information to be transferred and also the optimization of communication costs in accordance with the communication conditions.

For achieving the foregoing objects, a communication method in a first exemplary embodiment of the present invention is a method for performing wireless communications between a base station and a plurality of mobile stations, comprising the steps of:

(a) designating an upper limit p of transmitting power for a signal to be transmitted from the base station at the mobile station side;

(b) transmitting the designated upper limit p of transmitting power to the base station from the mobile station side;

(c) receiving at the base station the upper limit p of transmitting power from the mobile station side; and (d) determining an upper limit P of transmitting power of the base station to the mobile station side according to the upper limit p.

In the step (d) of the communication method in the first exemplary embodiment of the present invention, (c') the status of communication congestion of mobile stations engaged in communication is being watched at the base station and the upper limit P may be allowed to be determined according to the extent of communication congestion and the upper limit p, or the status of communication congestion of mobile stations engaged in communication may be watched via the summation of the upper limit P of the base station's communication power level against each respective mobile station communicating with the base station, or further the status of communication congestion may be watched via the summation of the upper p of each respective communication power level designated by the mobile stations engaged in communication.

Also, in the step (d) of the communication method in the first exemplary embodiment of the present invention, the upper limit P of transmitting power may be determined according to the upper limit p so as to satisfy an equation, $P = k \cdot p$ (, where $0 < k \leq 1$), and when the upper limit p is smaller than an upper limit actually in use, the upper limit P is also allowed to replace the upper limit p. Further, when the upper limit P of transmitting power used in the on-going communications is to be changed to the upper limit p, the upper limit used in communicating with mobile stations except for the mobile station that has transmitted the upper limit p is allowed to be reduced if the summation of those upper limits exceeds a predetermined threshold value.

Furthermore, in the step (d) of the communication method in the first exemplary embodiment of the present invention, when the upper limit P of transmitting power is about to be changed to the upper limit p, the on-going upper limit P is allowed to be maintained if the summation of the upper limit p of each respective mobile station engaged actually in communication exceeds a predetermined threshold value. In addition, when the upper limit P of transmitting power is about to be changed to the upper limit p, the upper limit P is allowed to be maintained if the summation of the upper limit of each respective mobile station engaged actually in communication exceeds a predetermined threshold value, and the upper limit P is also allowed to be made the upper limit p if the summation of each respective upper limit does not exceed a predetermined threshold value. At this time, (e) if the upper limit P now in use at the base station is maintained, the maintaining signal is allowed to be transmitted to mobile stations, and if the upper limit P is renewed, the renewed signal is also allowed to be transmitted to mobile stations.

Here, the threshold value as referred to in the above can be made the maximum value of communication power that the base station or mobile stations can output.

For achieving the foregoing objects, a communication method in a second exemplary embodiment of the present invention comprises the steps of:

(a) designating arbitrarily at the mobile station side an upper limit p' of transmitting power of a signal transmitted from the mobile station;

(b) transmitting from the mobile station side the designated upper limit p' of transmitting power to the base station;

(c) receiving at the base station the upper limit p' of transmitting power transmitted from the mobile station side;

(d) determining an upper limit P' of transmitting power of the mobile station according to the upper limit p' at the base station; and (e) transmitting the determined upper limit P' of the mobile station's transmitting power to the mobile station side from the base station.

With the communication methods in the first and second exemplary embodiments of the present invention as described in the above, in the step (a), the upper limit p of transmitting power of a signal from the base station and the upper limit p' of transmitting power of a signal from the mobile station may also be designated arbitrarily;

in the step (b), the designated upper limits p and p' of transmitting power may also be transmitted, respectively, to the base station;

in the step (c), the upper limits p and p' of transmitting power transmitted, respectively, from mobile stations may also be received; and in the step (d), the upper limit P of transmitting power of the base station against the mobile station may also be determined according to the upper limit p and the upper limit P' of the mobile station's transmitting power may also be determined according to the upper limit p'.

Here, (e) the upper limit P' of transmitting power determined for a particular mobile station is transmitted to the particular mobile station at the base station;

(f) communications are performed with the particular mobile station by using a transmitting power level Pp that does not exceed the determined upper limit P of transmitting power; and (b') at mobile stations, communications can be performed with the base station by a transmitting power level Pp' that does not exceed the determined upper limit P' of transmitting power.

In addition, (g) at the base station, an amount of fee charged to each respective mobile station can be determined according to the upper limit P of transmitting power of a signal sent from the base station to each mobile station, or an actual value Pp of transmitting power against each mobile station, or the upper limit P' of transmitting power of each mobile station, or an actual value Pp' of transmitting power of each mobile station.

Further, in the step (a) a transfer speed v or v' of the transmitted signal is arbitrarily designated in place of the upper limit p or p', respectively, in the step (b) the transfer speed v or v' is sent to the base station in place of the upper limit p or p', respectively, and in the step (c) the base station receives the transfer speed v or v' and can also apply a conversion to the upper limit p or p' of transmitting power according to the transfer speed v or v', respectively.

Further, in the step (a) a target value q of communication quality in wireless communications with the base station is designated arbitrarily, in the step (b) the designated target value q of communication quality is sent to the base station, in the step (c) the target value q of communication quality sent from a particular mobile station is received and in the step (d) a target value Q of communication quality in wireless communications with the particular mobile station may also be determined according to the received target value q of communication quality.

At this time, (h) the base station sends to a mobile station the information that a signal has been sent with an upper limit P of transmitting power and the target value Q of communication quality has not been achieved, and at the mobile station (i) the communications with the base station are terminated upon receiving the foregoing information, or (i) a new upper limit p1 that is larger than the upper limit P of the on-going transmitting power level is sent to the base station upon receiving the foregoing information, or (i) a new target value q1 that is lower than the target value Q of the on-going communication quality is sent to the base station upon receiving the foregoing information, or (i) a new upper limit p1 that is larger than the upper limit P of the on-going transmitting power level and a new target value q1 that is lower than the target value Q of the on-going communication quality are sent to the base station upon receiving the foregoing information, and (j) at the base station the steps (c) to (d) may also be performed according to the upper limit p1 and target value q1.

As an alternate approach, at the base station (h) a value q2 of communication quality of a signal sent from a particular mobile station is transmitted to the particular mobile station and, at mobile stations, communications with the base station are being performed with the upper limit P' of transmitting power of the foregoing particular mobile station and when the value q2 of communication quality is found to be lower than the target value Q of communication quality, (i) the communications with the base station are terminated, (i) a new upper limit p1' of the mobile station's transmitting power level that is larger than the upper limit P' of the on-going mobile station's transmitting power is sent to the base station, or (i) a new target value q1 of communication quality that is lower than the target value Q of the on-going communication quality is sent to the base station, or (i) a new upper limit p1' that is larger than the upper limit P of the on-going transmitting power level and a new target value q1 of communication quality that is lower than the target value Q of the on-going communication quality are sent to the base station, and (j) at the base station the steps (c) to (d) may also be performed according to the upper limit p1' and target value q1 of mobile stations.

Also, for achieving the foregoing objects, a communication method in a third exemplary embodiment of the present invention comprises the steps of:
(a) designating arbitrarily at a mobile station a target value q of communication quality in wireless communications with the base station;
(b) transmitting the designated target value q of communication quality to the base station;
(c) receiving at the base station the target value q of communication quality sent from the mobile station; and
(d) determining a target value Q of communication quality in wireless communications with the mobile station according to the received target value q of communication quality.

In addition to the foregoing setup, with the communication method in the third exemplary embodiment of the present invention, (c') the status of communication congestion of mobile stations engaged in communication is being watched at the base station and in the step (d) the target value Q of communication quality can also be determined according to the status of communication congestion and the target value q. Also, in the step (c') the status of communication congestion against the mobile stations engaged in communication may be watched via the summation of the target value Q of communication quality for each respective mobile station engaged in communication, or further the status of communication congestion may be watched via the summation of the target value q of communication quality designated by each respective mobile station engaged in communication.

Also, in the step (d) of the communication method in the third exemplary embodiment of the present invention, when the received target value q of communication quality is lower than a target value of communication quality used in communications with a mobile station, the target value Q of communication quality used in wireless communications with the mobile stations is allowed to be used as the received target value q of communication quality, and in case where the summation of target values of communication quality in wireless communications with each respective mobile station engaged in communication exceeds a predetermined threshold value when the target value Q of communication quality used in wireless communications with mobile stations is changed to the received target value q of communication quality, the target value of communication quality used in wireless communications with a mobile station different from the mobile station that has transmitted the target value q of communication quality can also be reduced.

Further, in the step (d) of the communication method in the third exemplary embodiment of the present invention, when the target value Q of communication quality in wireless communications with mobile stations is to be changed to the received target value q of communication quality, if the summation of target values of communication quality in wireless communications with each respective mobile station engaged in communication exceeds a predetermined threshold value, the target value Q of communication quality used in wireless communications with mobile stations is maintained, and if the summation of the target values of communication quality does not exceed the predetermined threshold value, the target value Q of communication quality used in wireless communications with mobile stations may also be allowed to be the received target value q of communication quality.

At this time, (e) when the target value Q of communication quality used in wireless communications with mobile stations is further maintained at the base station, a signal of maintaining the target value Q of communication quality is sent to mobile stations and when the target value Q of communication quality is renewed, a signal of renewing the target value Q may also be sent to mobile stations.

In the foregoing, it is recommended that the threshold value should be the upper limit of the summation of values representing the communication quality that can be maintained by the base station.

With the communication method in the third exemplary embodiment of the present invention, (f) a communication fee charged to a mobile station can be determined at the base station according to the target value Q of communication quality used in wireless communications with the mobile station.

In the step (d) of the communication method in the third exemplary embodiment of the present invention, the target values q and Q of communication quality can also be handled through a process of converting to thermal noise power, a reciprocal of a bit error rate (BER) per unit time, a ratio of signal power after back-diffusion to thermal noise power or a ratio of signal power per bit to noise power density.

It is recommended that with the communication methods in the first to third exemplary embodiments of the present invention, the wireless communications between the base station and a plurality of mobile stations should also be employing spread spectrum communications. At this time, in the step (d) of the communication method in the third exemplary embodiment of the present invention, the target values q and Q of communication quality can also be handled through a process of converting to thermal noise power derived by calculation from a ratio of signal power after back-diffusion to thermal noise power, or thermal noise power calculated from a ratio of signal power per bit to noise power density and a diffusion rate of spread spectrum communications. Further, the foregoing method of spread spectrum communications may also be replaced with a method of code division multiple access (CDMA) communications.

For achieving the aforementioned objects, the communication system in a first exemplary embodiment of the present invention comprises:
  a base station; and
  a plurality of mobile stations to perform wireless communications between the base station and the plurality of mobile stations, the plurality of mobile stations having, respectively:
    a transmitting power designating means to designate an upper limit p of transmitting power for a signal transmitted from the base station; and
    a transmitting means to send the upper limit p of transmitting power designated by the transmitting power designating means, and the base station having:
      a receiving means to receive the upper limit p of transmitting power sent from mobile stations; and
      a transmitting power determining means to determine an upper limit P of transmitting power when a signal is sent to mobile stations.

Also, for achieving the aforementioned objects, a communication system in a second exemplary embodiment of the present invention comprises:
  a base station; and
  a plurality of mobile stations, the plurality of mobile stations having, respectively:
    a transferring speed designating means to designate a transferring speed v of a signal sent from the base station; and
    a transmitting means to send the transferring speed v designated by the transferring speed designating means to the base station, and the base station having:
      a receiving means to receive the transferring speed v sent from mobile stations;
      a transmitting power converting means to convert an upper limit p of transmitting power according to the transferring speed v; and
      a transmitting power determining means to determine an upper limit P of transmitting power according to the upper limit p of transmitting power when a signal is sent to mobile stations.

Further, with the communication system in the first or second exemplary embodiment of the present invention as described in the above, such arrangements as:
  the transmitting power designating means of a mobile station designates an upper limit p' of transmitting power for a signal sent from the mobile station;
  the transmitting means of the mobile station sends the upper limit p' to the base station;
  the receiving means of the base station receives the upper limit p' sent from the mobile station; and
  the transmitting power determining means of the base station determines an upper limit P' of transmitting power according to the upper limit p' when a signal is sent from the mobile station to the base station, may also be made.

Still further, with the communication system in the first or second exemplary embodiment of the present invention as described in the above, such arrangements as:
  the transferring speed designating means of a mobile station designates a transferring speed v' for a signal sent from the mobile station; the transmitting means of the mobile station sends the transferring speed v' to the base station;
  the receiving means of the base station receives the transferring speed v' sent from the mobile station; and
  the transmitting power determining means of the base station derives an upper limit p' of transmitting power by conversion according to the transferring speed v' and determines an upper limit P' of transmitting power via the upper limit p' when a signal is sent from the mobile station to the base station, may also be made.

In addition, with the communications systems of the present invention as described in the above, the base station may have a communication congestion status detecting means to detect the status of communication congestion of mobile stations engaged actually in communication among the plurality of mobile stations, and the transmitting power determining means of the base station may be allowed to have the ability of determining the upper limit P of transmitting power used at the time of transmitting a signal to a mobile station according to the status of communication congestion detected by the communication congestion status detecting means and the upper limit p. At this time, the communication congestion status detecting means may also be allowed to detect the status of communication congestion via the summation of the upper limit P of communication power of each respective mobile station engaged actually in communication among the plurality of mobile stations, or the summation of the upper limit p of communication power designated by each respective mobile station engaged actually in communication.

Further, the transmitting power determining means may also be set up so as to determine the upper limit P of transmitting power of a mobile station in such a way as satisfying an equation, $P=k \cdot p$ (, where $0<k \leqq 1$), according to the upper limit p.

When the upper limit p or p' is smaller than the upper limit P or P' that is used in communication, such an arrangement for the transmitting power determining means as determining the upper limit P or P' of transmitting power to be the upper limit p or p', respectively, may also be possible.

When the transmitting power determining means is provided with the ability of determining the upper limit P of transmitting power used in communication to be the upper limit p, in case where the summation of the upper limit P of transmitting power of each respective mobile station engaged actually in communication among the plurality of mobile stations exceeds a predetermined threshold value, such an arrangement as maintaining the upper limit P used in communication is also possible, and further in case where the summation of the upper limit P does not exceed the predetermined threshold value, such an arrangement as determining the upper limit P to be renewed as the upper limit p may also be possible. When the upper limit P of transmitting power used in communicating with mobile stations is determined to be the upper limit p, the upper limit of transmitting power used in communicating with mobile stations different from the mobile station that has transmitted the upper limit p may also be reduced in case where the summation of the upper limit of transmitting power of each respective mobile station engaged actually in communication among the plurality of mobile stations exceeds a predetermined threshold value.

Further in the foregoing, if the base station determines for the transmitting power determining means to maintain the upper limit P, the base station may also be allowed to have a transmitting means to send a signal for maintaining the upper limit P to mobile stations, and if the upper limit P of transmitting power is renewed, a renewal signal of the upper limit P may also be transmitted to mobile stations.

Here, the foregoing threshold value is allowed to be the maximum value of communication power that the base station can put out.

For achieving the aforementioned objects, a communication system in a third exemplary embodiment of the present invention comprises:
  a base station; and
  a plurality of mobile stations, each of the plurality of mobile stations having, respectively:
    a transmitting power designating means to designate an upper limit p' of transmitting power for a signal transmitted from the mobile station; and
    a transmitting means to send the upper limit p' of transmitting power designated by the transmitting power designating means to the base station, and the base station having:
    a receiving means to receive the upper limit p' of transmitting power sent from mobile stations;
    a transmitting power determining means to determine an upper limit P' of transmitting power for mobile stations via the upper limit p' received at the receiving means; and
    a transmitting means to send the upper limit F determined at the transmitting power determining means to mobile stations.

Also, for achieving the aforementioned objects, a communication system in a fourth exemplary embodiment of the present invention comprises:
  a base station; and
  a plurality of mobile stations, each of the plurality of mobile stations having, respectively:
    a transferring speed designating means to designate a transferring speed v' of
    a signal sent from the base station; and
    a transmitting means to send the transferring speed v' designated by the transferring speed designating means to the base station, and the base station having:
      a receiving means to receive the transferring speed v' sent from mobile stations;
      a transmitting power converting means to convert an upper limit p' of transmitting power according to the transferring speed v';
      a transmitting power determining means to determine an upper limit P' of transmitting power according to the upper limit p' of transmitting power; and
      a transmitting means to send the upper limit P' determined by the transmitting power determining means to mobile stations.

With the foregoing communication systems of the present invention, a setup, wherein:
  the base station has a transmitting means to send the upper limit P' to mobile stations;
  each respective mobile station has a receiving means to receive the upper limit P' sent from the base station; and
  each respective mobile station has a controlling means to control the transmitting power Pp' of the transmitting means to less than the upper limit P', can be employed. In addition, the base station is also allowed to have a controlling means to control the transmitting power Pp of the transmitting means to less than the upper limit P.

Further, with the foregoing communication systems of the present invention, the base station may also have a charge determining means to determine the amount of a fee to be charged to respective mobile stations according to the upper limit P, transmitting power Pp, upper limit P' or transmitting power Pp'.

Still further, with the foregoing communication systems of the present invention, each of the plurality of mobile stations may also have, respectively:
  a communication quality designating means to designate a target value q of communication quality in wireless communications with the base station; and
  a controlling means to control the transmitting means so as to send the target value q designated by the communication quality designating means to the base station, and the base station may also have:
    a controlling means to control a receiving means so as to receive the target value q sent from mobile stations and a communication quality determining means to determine a target value Q of communication quality in wireless communications with mobile stations according to the target value q.

Here, the base station may also be provided with a setup including:
  a transmitting means to send to mobile stations such information that signals are being transmitted with the upper limit P of communication power and communication quality has not yet reached the target value Q, and respective mobile stations may also be provided with a setup including:
  a receiving means to receive signals carrying the foregoing information from the base station; and
  a controlling means to terminate communications with the base station upon receiving the information through the receiving means, or to control the transmitting means so as to send to the base station a new upper limit p1 of transmitting power that is larger than the on-going upper limit P of transmitting power, or to control the transmitting means so as to send to the base station a new target value q1 of communication quality that is lower than the on-going target value Q of communication quality, or to control the transmitting means so as to send to the base station the new upper limit p1 of transmitting power that is larger than the on-going upper limit P of transmitting power and the new target value q1 of communication quality that is lower than the on-going target value Q of communication quality.

With the foregoing communication systems of the present invention, each of the plurality of mobile stations may also have, respectively:

a communication quality designating means to designate a target value q of communication quality in wireless communications with the base station;

a controlling means to control a transmitting means so as to send the target value q designated by the communication quality designating means to the base station; and a receiving means to receive signals and the like from the base station, and the base station may also have:

a controlling means to control a receiving means so as to receive the target value q sent from mobile stations;

a communication quality determining means to determine a target value Q of communication quality in wireless communications with mobile stations according to the target value q; and a means to transmit to mobile stations an actual value q2 of communication quality detected from the signals received by the receiving means, and the base station has:

a controlling means to control the receiving means so as to receive the target value q sent from mobile stations;

a communication quality determining means to determine a target value Q of communication quality according to the target value q; and a means to sent to mobile stations an actual communication quality value q2 of signals received at the receiving means, and the controlling means of mobile stations is provided with functions including:

controlling the transmitting means so as to terminate communications with the base station in case where, while the transmitting means sending signals with the upper limit P' of transmitting power, the value q2 of communication quality received through the receiving means is lower than the target value Q of communication quality; or controlling the transmitting means so as to send to the base station a new upper limit p1' of mobile station's transmitting power that is larger than the upper limit P'; or controlling the transmitting means so as to send to the base station a new target value q1 of communication quality that is lower than the target value Q; or controlling the transmitting means so as to send to the base station the new upper limit p1' of mobile station's transmitting power that is larger than the upper limit P' and the new target value q1 of communication quality that is lower than the target value Q.

For achieving the aforementioned objects, a communication system in a fifth exemplary embodiment of the present invention comprises:

a base station; and a plurality of mobile stations to perform wireless communications between the base station and the plurality of mobile stations, the plurality of mobile stations having, respectively:

a communication quality designating means to designate a target value q of communication quality in wireless communications with the base station; and a transmitting means to send the target value q designated by the communication quality designating means, and the base station having:

a receiving means to receive the target value q sent from mobile stations; and a communication quality determining means to determine a target value Q of communication quality in wireless communications with mobile stations according to the target value q received at the receiving means.

With the communication system in the fifth exemplary embodiment of the present invention as described in the above, the base station may also have a setup comprising:

a communication congestion status detecting means to detect the status of communication congestion of mobile stations engaged actually in communication among the plurality of mobile stations; and a communication quality determining means to determine a target value Q of communication quality in wireless communications with mobile stations according to the status of communication congestion detected by the communication congestion status detecting means and the target value q received via the receiving means. Alternatively, the status of communication congestion of mobile stations engaged actually in communication may also be detected by the communication congestion status detecting means according to the summation of target value Q of communication quality in wireless communications with respective mobile stations actually engaged in communication, or the summation of target value q of communication quality in wireless communications designated by respective mobile stations engaged actually in communication.

At this time, if the target value q is lower than the target value of communication quality used in wireless communications with mobile stations, the communication quality determining means may also be allowed to determine the target value q to be the target value Q of communication quality used in wireless communications with mobile stations. When the summation of target values of communication quality in wireless communications with respective mobile stations actually engaged in communication among the plurality of mobile stations exceeds a predetermined threshold value, the target value Q of communication quality used in wireless communications with mobile stations can be maintained or the target value of communication quality used in wireless communications with other mobile stations than the mobile station, which has transmitted the target value q, can be lowered. Conversely, when the summation of target values of communication quality does not exceed the predetermined threshold value, the target value Q of communication quality used in wireless communications with mobile stations can also be determined to be the target value q.

Furthermore, if the base station determines via the communication quality determining means that the target value Q of communication quality used in wireless communications with mobile stations is to be maintained, a target value Q maintaining signal is sent to mobile stations, and when the target value Q of communication quality is determined to be renewed, such a setup as having a transmitting means to send a renewal signal of the target value Q may also be adopted.

At this time, the foregoing threshold value can be made the upper limit of the summation of the communication quality that the base station can maintain.

Also, in the foregoing communication system in the fifth exemplary embodiment of the present invention, the base station can be set up so as to have a charge amount determining means to determine a fee charged to each respective mobile station according to the target value Q of communication quality.

In addition, in the foregoing quality determining means, the target values q and Q of communication quality can be handled through a process of converting to thermal noise power, a reciprocal of a bit error rate (BER) per unit time, a ratio of signal power after back-diffusion to thermal noise power or a ratio of signal power per bit to noise power density.

In the foregoing communication system of the present invention, the wireless communications that take place between the base station and a plurality of mobile stations can be performed by spread spectrum communications. At this time, in the communication quality determining means, the target values q and Q may also be handled through a process of converting to thermal noise power derived by calculation from a ratio of signal power after back-diffusion to thermal noise power or a ratio of signal power per bit to noise power density and a diffusion rate of spread spectrum communications. Further, the spread spectrum communications may also be replaced with CDMA communications.

According to the foregoing communication methods and communication systems of the present invention, such communication conditions in wireless communications as transmitting power of the base station and mobile stations, signal transferring speed, communication quality of received signals and the like can be designated arbitrarily at the mobile station side and, therefore, the communication status can be set up optimally so as to match the nature of information transferred by the user and the communication environment involved with the user.

In addition, by detecting and watching the status of congestion in communication, the on-going condition of communication can be correctly grasped, thereby allowing the base station's ability to be utilized correctly and also to the maximum. Also, by grasping the status of congestion in communication under the same communication conditions as applicable in controlling the communications with mobile stations such as transmitting power, transferring speed, communication quality and the like, the base station's communication ability can be readily utilized correctly and also to the maximum.

Since communication quality can be converted to thermal noise power, a reciprocal of a bit error rate (BER), a ratio of signal power after back-diffusion to thermal noise power or a ratio of signal power per bit to noise power density, the level of communication quality can be optimally selected, as needs require, according to the environment involved with communication systems and communication facilities.

Also, communication fees are charged according to the communication conditions designated at the mobile station side and, therefore, the use can set up the communication conditions and communication costs optimally.

By employing spread spectrum communications and CDMA communications in wireless communications for the communication method and communication system of the present invention, the benefits as described in the above are made to function more effectively.

DESCRIPTION OF THE PREFERRED EMBODIMENTS

Next, a detailed description is given to a communication method and a communication system of the present invention with reference to drawings.

Figure 1:
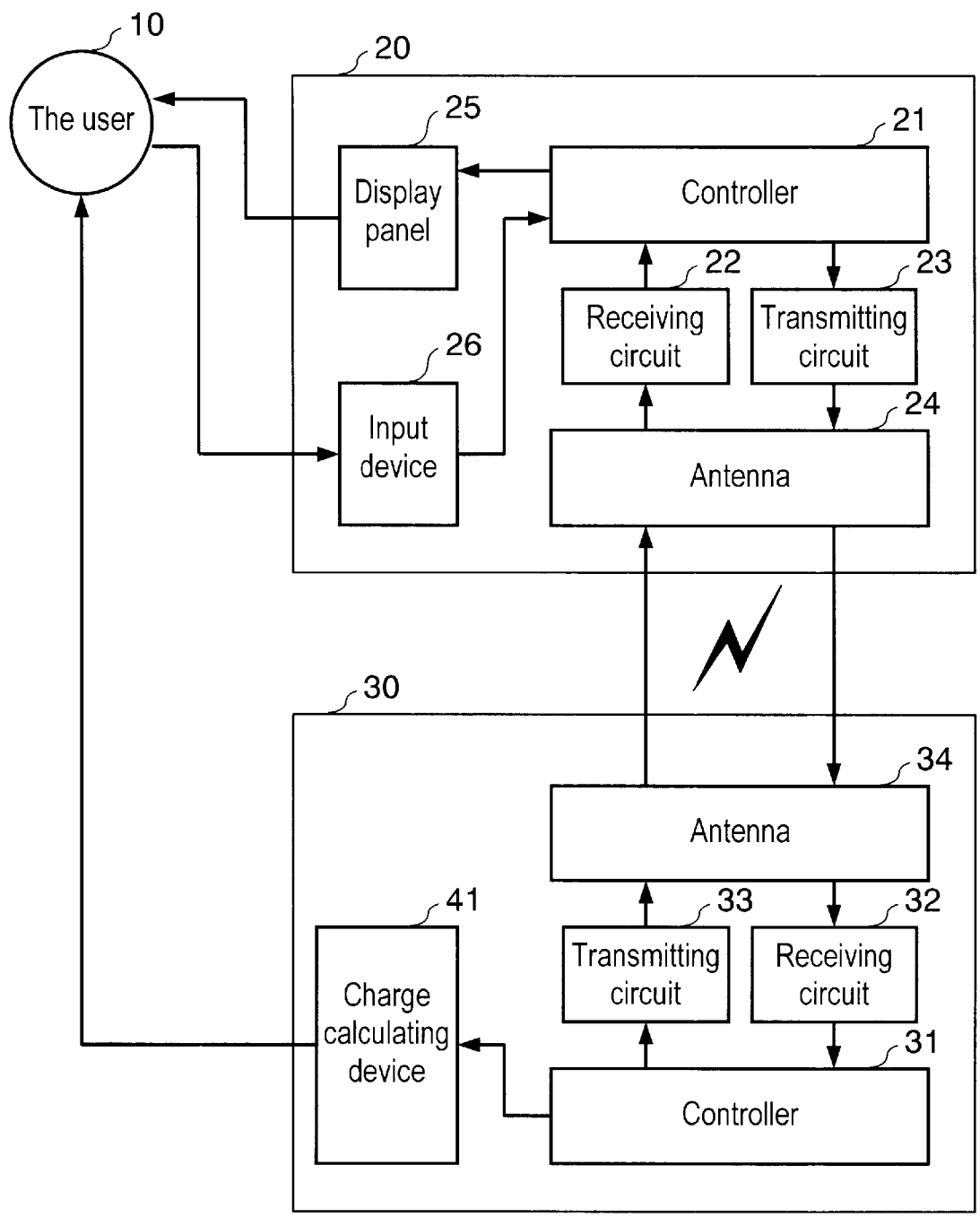
FIG. 1 is a diagrammatic sketch of a communication system in an exemplary embodiment of the present invention.

FIG. 1 to FIG. 5 are schematic diagrams to show exemplary setups of a communication system of the present invention. FIG. 1 is a diagrammatic sketch of an overall setup of a communication system of the present invention. This communication system has mobile stations 20 such as portable telephones and the like, and a base station 30 provided with a predetermined wireless zone for wireless communications.

Each respective mobile station 20 is provided with a controller 21 to control respective building blocks of the mobile station 20, an antenna 24 to transmit/receive wireless signals, a receiving circuit 22 to receive signals via the antenna 24, a transmitting circuit 23 to transmit signals via the antenna 24, an input device 26 such as a keyboard and the like for the user 10 to input telephone numbers and control information and a display panel 25 to display the information such as information about communicating partners and the like inputted via the input device 26.

The base station 30 is provided with a controller 31 to control respective building blocks of the base station 30, an antenna 34 to transmit/receive wireless signals, a receiving circuit 32 to receive signals via the antenna 34, a transmitting circuit 33 to transmit signals via the antenna 34 and a charge calculating device 41 to calculate a charge for wireless communications exchanged with each respective mobile station. The charge calculating device 41 may also be set up in a separate exchange (not shown in FIG. 1) to connect to a plurality of base stations.

Figure 2:
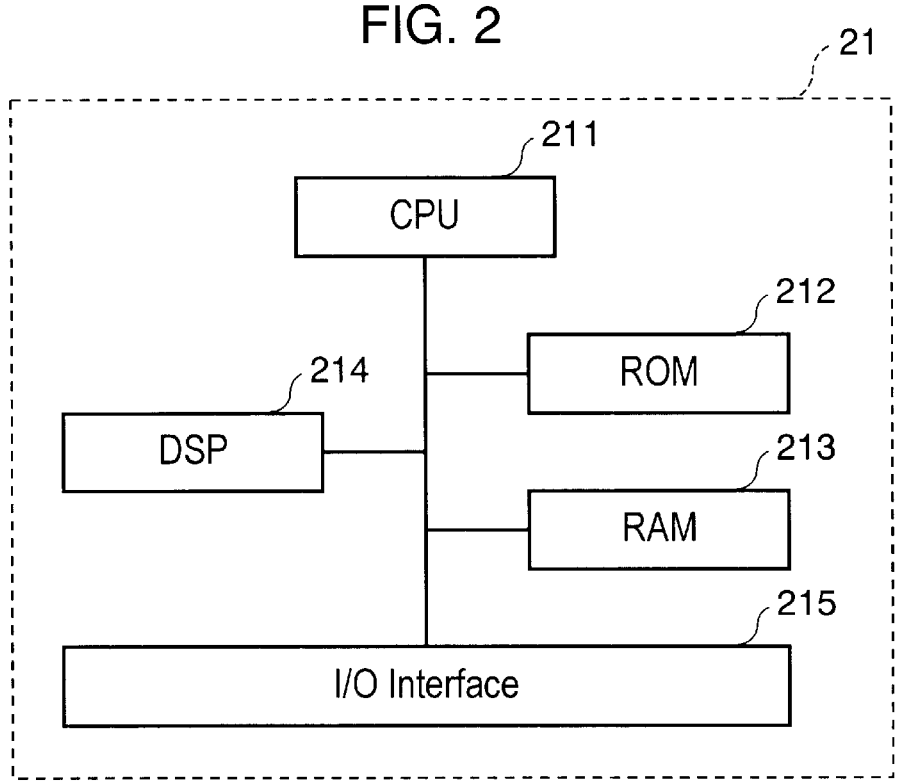
FIG. 2 is a diagrammatic sketch of a hardware setup of a controller for a mobile station in the communication system of FIG. 1.

FIG. 2 is a diagrammatic sketch of an example of a hardware setup of the controlling circuit 21 for the mobile station 20 of FIG. 1. The controlling circuit 21 is provided with a CPU (Central Processing Unit) 211 for controlling the whole station, a ROM (Read Only Memory) 212 to store various control data and programs, a RAM (Random Access Memory) 213 to store information and the like inputted via the input device 26 by the user 10, a DSP (Digital Signal Processor) 214 to perform digital signal processing such as multiplication, cumulative multiplication and the like for band compression of audio signals and an I/O (Input/Output) interface 215 to connect to and exchange data with the receiving circuit 22, transmitting circuit 23, display panel 25 and input device 26 as FIG. 1 shows.

Figure 3:
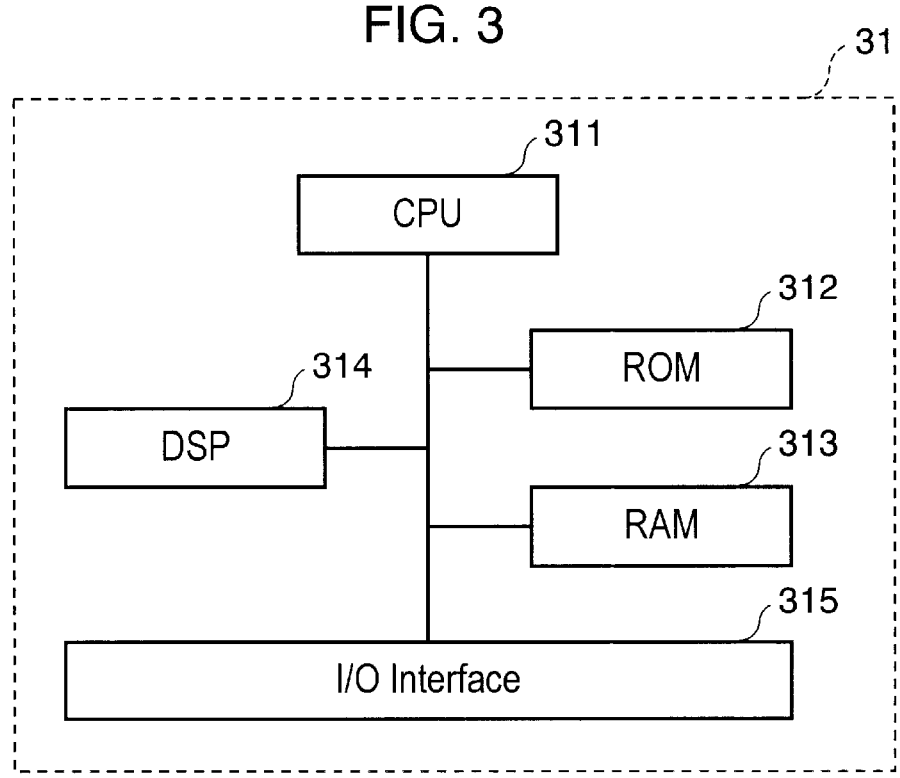
FIG. 3 is a diagrammatic sketch of a hardware setup of a controller for a base station of the communication system of FIG. 1.

FIG. 3 is a diagrammatic sketch of an example of a hardware setup of the controller 31 of the base station 30 as FIG. 1 shows. The controller 31 is provided with a CPU 311 for controlling the whole equipment, a ROM 312 to store various control data and control programs, a RAM 313 to store such information as showing the status of communication congestion, communication conditions and the like, a DSP 314 to perform digital signal processing and an I/O interface 315 to connect to and exchange data with the receiving circuit 32, transmitting circuit 33 and charge calculating device 41 as FIG. 1 shows.

Figure 4:
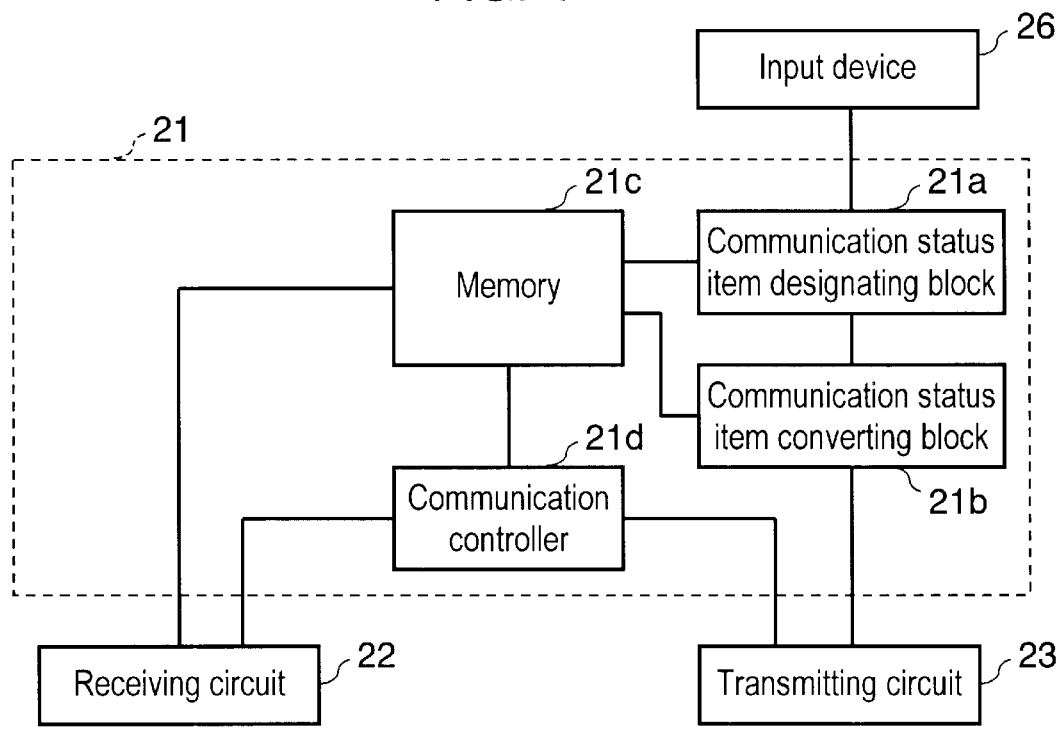
FIG. 4 is a block diagram to show the functions of a controller for a mobile station of the communication system of FIG. 1.

FIG. 4 is a block diagram to show the functions of the controlling circuit 21 of the mobile station 20 as FIG. 1 shows. In FIG. 4, the same building blocks as appearing in FIG. 1 are given the same reference symbols as used in FIG. 1. In FIG. 4, the controller 21 is connected to the input device 26 and provided with a communication status item designating block 21a to designate the status of communication with the base station 30 (FIG. 1) according to the communication status item inputted via the input device 26, a communication status item converting block 21b to convert the item designated by the communication status item designating block 21a to a predetermined item, a memory 21c to store the communication status item, converted item and the like and a communication controller 21d to control the receiving circuit 22, transmitting circuit 23 and the like. Here, the memory 21c corresponds to the ROM 212 and RAM 213 as FIG. 2 shows.

Figure 5:
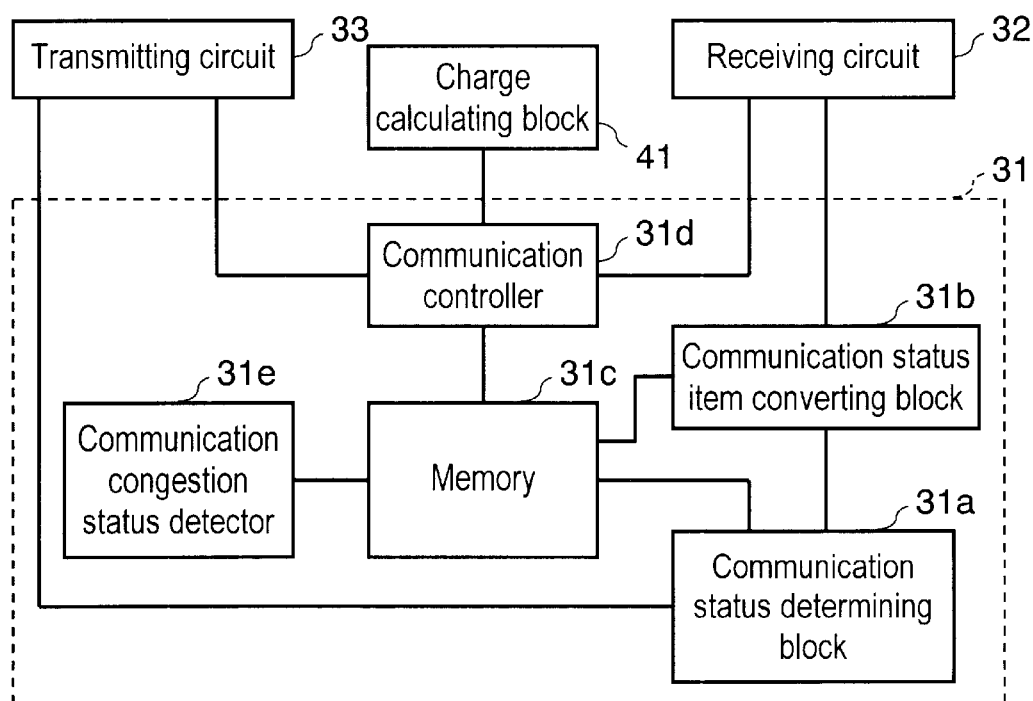
FIG. 5 is a block diagram to show the functions of a controller for a base station of the communication system of FIG. 1.

FIG. 5 is a block diagram to show the functions of the controller 31 of the base station 30. In FIG. 5, the same building blocks as appearing in FIG. 1 are given the same reference symbols as used in FIG. 1. In FIG. 5, the controller 31 is provided with a communication status item converting block 31b to convert the communication status item designated by the mobile station 20 to a predetermined item, a communication status determining block 31a to determine the status of communication with the mobile station 20 (FIG. 1) according to the communication status item designated by the mobile station 20 or the item converted at the communication status item converting block 31b, a communication congestion status detector 31e to detect the status of congestion in communication exchanged with the whole mobile stations, a memory 31c to store the status of communication congestion, a determined value of communication status item and the like, and a communication controller 31d, connected with the charge calculating device 41, to control the receiving circuit 22, transmitting circuit 23 and the like. Here, the memory 31c corresponds to the ROM 312 and RAM 313 as shown in FIG. 3.

Figure 6:
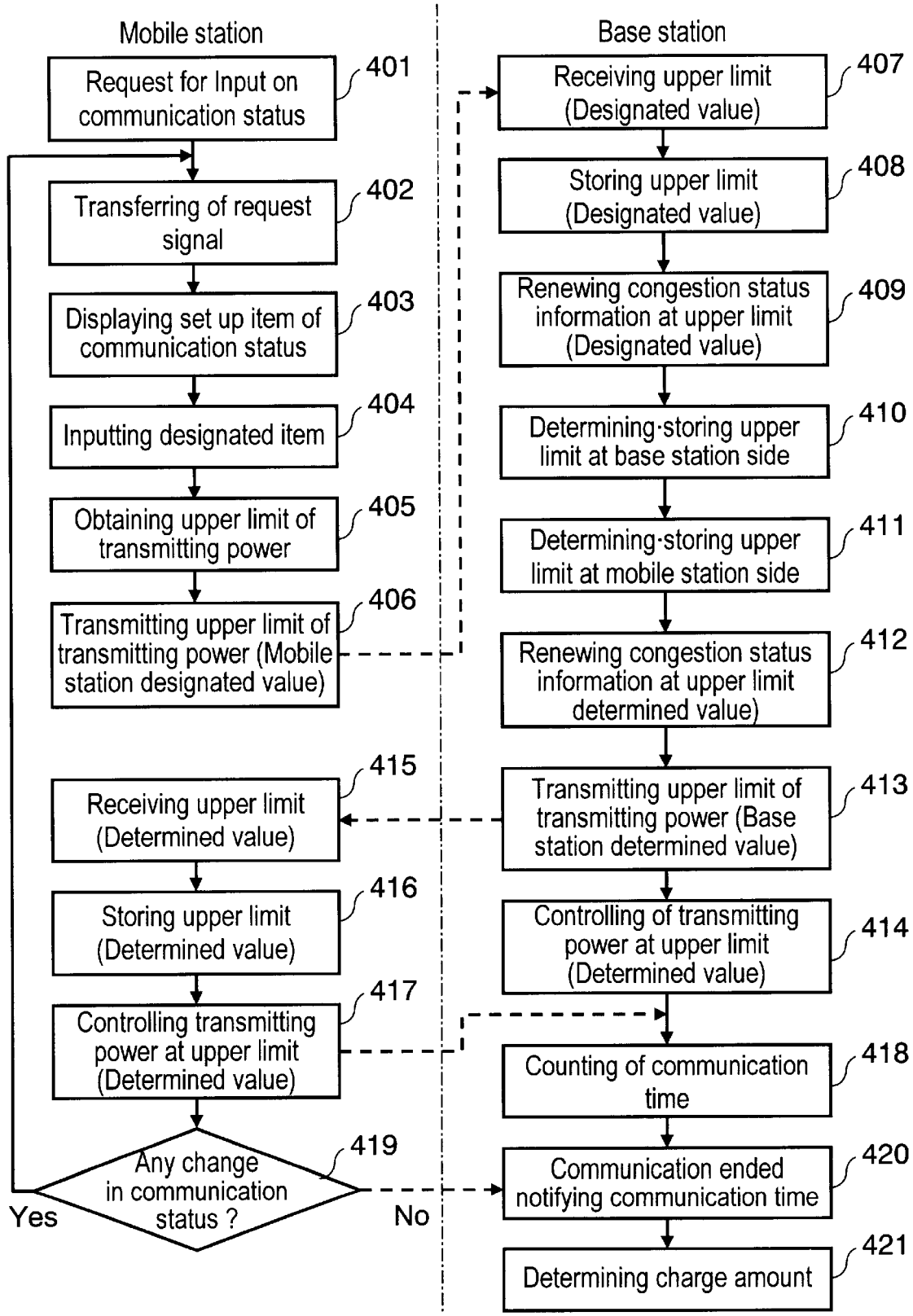
FIG. 6 is a flow chart to show a communication method according to a communication system in an exemplary embodiment of the present invention.

FIG. 6 is a flow chart to show briefly an example of a communication method in the foregoing communication system. Next, in reference to FIG. 1 to FIG. 6, a description is given to wireless communications in the communication system of the present invention, and particularly a description is given to a case, where wireless communications are performed optimally while the communication status being designated arbitrarily at the mobile station 20 side, First, the user 10 inputs a request signal to the input device 26 of the mobile station 20 such as a portable telephone and the like for setting up or changing a communication status. (401) This request signal is sent to the CPU211 via the I/O.IF 215. (402) The CPU211 controls a communication status determining program of the ROM 212 according to the request signal and a communication status determining item is displayed on the display panel 25. (403) In the communication status determining items are included an upper limit p [nW] of transmitting power at the base station side, an upper limit p' [mW] of transmitting power at the mobile station side, a transfer speed v [bps] of signals sent from the base station side, a transferring speed v' [bps] of signals sent from the mobile station side, a target value q of communication quality between the mobile station 20 and the base station 30, a charge rank m and the like. The user 10 selects an arbitrary item from the determining items displayed on the display panel 25 and inputs a value corresponding to the item as the designated item via the input device 26. (404) This designated item is allowed to be stored in the memory 21c (RAM 213).

Next, a description is given to the case where the inputted designated item is the charge rank m. When the designated item inputted via the input device 26 is the charge rank m, the communication status item designating block 21a of the controlling circuit 21sends the inputted charge rank m to the communication status item converting block 21b, where the charge rank m is converted to the upper limits of transmitting power (values designated by mobile stations) p and p' of the base station 30 and mobile station 20, respectively. (405) These values are also allowed to be determined with reference to a table prepared in advance by storing in the memory 21c (ROM 212) so as to show the relationship between the charge rank m and the upper limits p and p' of transmitting power for the base station 30 and mobile station 20, respectively, for example. Also, the relationship between the charge rank m and the upper limits p and p' of transmitting power for the base station 30 and mobile station 20, respectively, is expressed by a predetermined mathematical model, for example, as follows:

Mathematical Model 1

$$p=\alpha \cdot m,\ p'=\beta \cdot m$$

(The $\alpha$ and $\beta$ are constants, where $0<\alpha,\ \beta$.) The upper limits p and p' of transmitting power are allowed to be derived by calculation from the mathematical model 1.

Next, the upper limits p and p' of transmitting power obtained as above are stored in the memory 21c (RAM 213) within the controller 21 and at the same time transferred to the transmitting circuit 23 to be sent to the base station 30 via the antenna 24. (406)

The base station 30 receives from the mobile station 20 the upper limits p and p' of transmitting power via the antenna 34 at the receiving circuit 32. (407) The received upper limits p and p' of transmitting power are stored in the RAM 313 (Memory 31c) via the I/O.IF 315 of the controller 31. (408) Respective values of the upper limit p (designated by mobile stations) of transmitting power sent from respective mobile stations engaged in communication and stored in the memory 31c (RAM 313) are put together at the communication congestion status detector 31e and stored in the memory 31c (RAM 313) as communication congestion status information p0 (p0=Σp). (409) The communication status determining block 31a of the controller 31 of the base station 30 determines an upper limit P of transmitting power of the base station 30 by the use of the upper limit p of transmitting power from the mobile station 20 and the information p0 on communication congestion status stored in the memory 31c (RAM 313) or information P0 that is described later, and stores the upper limit P in the memory 31c (RAM 313). (410) Further, the communication status determining block 31a determines an upper limit P' of transmitting power of the mobile station 20 according to the upper limit p' of transmitting power from the mobile station 20 and a threshold value of the upper limit of transmitting power of the mobile station 20 stored in advance in the memory 31c (RAM 313) within an extent not exceeding the threshold value and store the upper limit P' in the memory 31c (RAM 313). (411) In addition, each respective upper limit P of transmitting power of the base station 30 determined for respective mobile stations is put together at the communication congestion status detector 31 and stored in the memory 31c (RAM 313) as information P0 (P0=Σ) of communication congestion status (412) for making the use in the foregoing step 410 possible. The communication controller 31d in the controller 31 of the base station 30 transmits the upper limits P and P' of transmitting power (determined at the base station) of the base station 30 and mobile station 20, respectively, stored in the memory 31c (RAM 313) to the mobile station 20 from the transmitting circuit 33 via the antenna 34. (413) The communication controller 31d controls the transmitting power of the transmitting circuit 33 in such a way that an actual transmitting power Pp to the mobile station 20 may not exceed the upper limit P of transmitting power of the base station 30 stored in the memory 31c (RAM 313). (414)

The mobile station 20 receives the upper limits P and P' (determined at the base station) of transmitting power at the receiving circuit 22 via the antenna 24. (415) The received upper limits P and P' are stored in the RAM 213 (Memory 21c) via the I/O.IF 215 of the controller 21. (416) The communication controlling circuit 21d in the controller 21 of the mobile station 20 controls the transmitting power of the transmitting circuit 23 in such a way that the transmitting power Pp' of the mobile station 20 may not exceed the upper limit P' of transmitting power. (417)

The communication controller 31d of the base station 30 counts the time t of communication exchanged with the mobile station 20. (418) When a request for resetting or changing the communication status is inputted from the user 10 while engaged in communication (419), the process of Step 402 to Step 417 is repeated. Upon finishing the communication with the mobile station 20, the communication controller 31d of the base station 30 informs the charge calculating device 41 of the respective upper limits P and P' (determined at the base station) of transmitting power at the base station and mobile stations and the time t of communication. (420) At this time, in case where the upper limits P and P' of transmitting power are changed halfway, the time of communication for each respective upper limit of transmitting power is to be informed to the charge calculating device 41, where an amount of charge M is determined according to the upper limits P and P' of transmitting power and time t of communication. (421) The amount of charge M is also allowed to be determined according to a mathematical model 2 as follows, for example:

Mathematical Model 2

$$M = k \cdot P \cdot t$$

or $$M = k' P' \cdot t$$

(The k and k' are predetermined constants.)
The mathematical model 2 can also be stored in advance in the charge calculating device 41 of the base station 30. Also, the mathematical model 2 is arranged to be stored in the memory 31c (RAM 313) of the controller 31 and the amount of charge M is allowed to be calculated in the communication controller 31d. Thus, the amount of charge M can be collected from the user 10. (413)

An example of the communication method in the communication system of the present invention is described briefly in the above, and in Step (410) where the upper limit P of transmitting power of the base station 30 is determined, the information p0 and information P0 of communication congestion status are not needed to be considered. Further, the upper limit P of transmitting power is also allowed to be determined according to a mathematical model 3 as follows:

Mathematical Model 3

$$P = k \cdot p$$

The k is a constant, where $0 < k \leq 1$.)

In case where the relation between the on-going upper limit (P=Pc) of transmitting power of the base station 30 to the mobile station 20 and the upper limit p of transmitting power sent from the foregoing mobile station 20 is expressed by an inequality of $p \leq Pc$, or equivalently, the on-going upper limit Pc is requested to be lowered, the communication status determining block 31a of the base station 30 is also allowed to renew at once the on-going upper limit Pc to the received upper limit p (P=p).

Also, a threshold value P1 of the summation of transmitting power of the base station 30 is stored in the memory 31c (RAM 313) and then the relations between the foregoing communication congestion status information P0, on-going upper limit Pc of transmitting power of the base station 30 against the mobile station 20 and upper limit p of transmitting power sent from the mobile station 20 may be checked at the communication status determining block 31a as follows:
When P0−Pc+p (the summation of communication power of the mobile station 30 after a renewal of the upper limit) exceeds P1 (a threshold value of the summation of transmitting power of the base station 30), i.e. (P0−Pc+p>P1), controlling can also be performed so as to maintain the on-going upper limit P=Pc of transmitting power of the base station 30 against the mobile station 20 as is.
Further, the upper limit P of transmitting power can also be made equal to the maximum value within an allowable range, i.e. P=P1−(P0−Pc). Still further, the upper limit p of transmitting power is made to satisfy $P0-Pc+p \leq P1$ by lowering the upper limit of transmitting power of other mobile stations engaged in communication than the mobile station 20 that has requested the upper limit p of transmitting power, thereby allowing the mobile station designated value p as is also to be used as the base station determined value P.

Also, this threshold value P1 can be used as a limit P2 of transmitting power of the base station 30. Accordingly, controlling can be performed at the communication status determining block 31a so that the communication congestion status information PO may not exceed the limit P2 at all times.

In the foregoing, the communication congestion status detector 31e can also make the communication congestion status information as the summation p0 of mobile station designated value p in place of the summation P0 of base station determined value P. At this time, the communication status determining block 31a might be better controlled for the relation between P0 and p0 to satisfy the following mathematical model 4:

Mathematical Model 4

$$P0=P1\times\{1-\exp(-p0/P1)\},$$

where P1 is a threshold value of the summation of transmitting power of the base station 30. Here, by using the upper limit P2 of transmitting power in place of the threshold value P1, controlling can be performed at the communication status determining block 31a so that the communication congestion status information P0 may not exceed the upper limit P2 at all times.

A description has been so far given to a communication method in the communication system of the present invention in the above, and in Step 404 and Step 405 of FIG. 6 the upper limits p and p' (mobile station designated values) of transmitting power can also be designated via the input device 26 directly instead of deriving the upper limits p and p' of transmitting power from a charge rank m. In this case, a designated value at the communication status item designating block 21a is arranged to be transferred as is to the transmitting circuit 23 by the communication status item converting block 21.

In Step 405 of FIG. 6, instead of deriving the upper limits p and p' (mobile station designated values) by converting from the charge rank m at the communication status item converting block 21b of the mobile station 20, the charge rank m is sent to the base station 30 and may also be converted to the upper limits p and p' (mobile station designated values) at the communication status item converting block 31b of the controller 31 at the mobile station 30. In this case, the foregoing table and mathematical model 1 are arranged to be stored in advance in the memory 31c (ROM 312) of the controller 31 at the base station 30.

In Step 404 of FIG. 6, a transferring speed v at the base station side, a transferring speed v' at the mobile station side or a target value q of communication quality between the mobile station 20 and the base station 30 can also be designated by inputting via the input device 26. At this time, the upper limits p and p' (mobile station designated values) may also be derived from the transferring speeds v and v' at the communication status item converting block 21b in Step 405 (mobile station side) or the transferring speeds v and v' are transmitted to the base station 30 as they are and the upper limits p and p' (mobile station designated values) may also be arranged to be derived from the transferring speeds v and v' at the communication status item converting block 31b of the base station 30. In this case also, a table of the relation between the transferring speeds v and v' and the upper limits p and p' of transmitting power and the following mathematical model 5 prepared are arranged in advance to be stored in the memory 21c (ROM 212) of the mobile station 20 or in the memory 31c (ROM 312) of the base station 30.

Mathematical Model 5

$$p=\alpha\cdot v,\ p'=\beta\cdot v'$$

(The $\alpha$ and $\beta$ are constants, where $0<\alpha,\ \beta$.)

Figure 7:
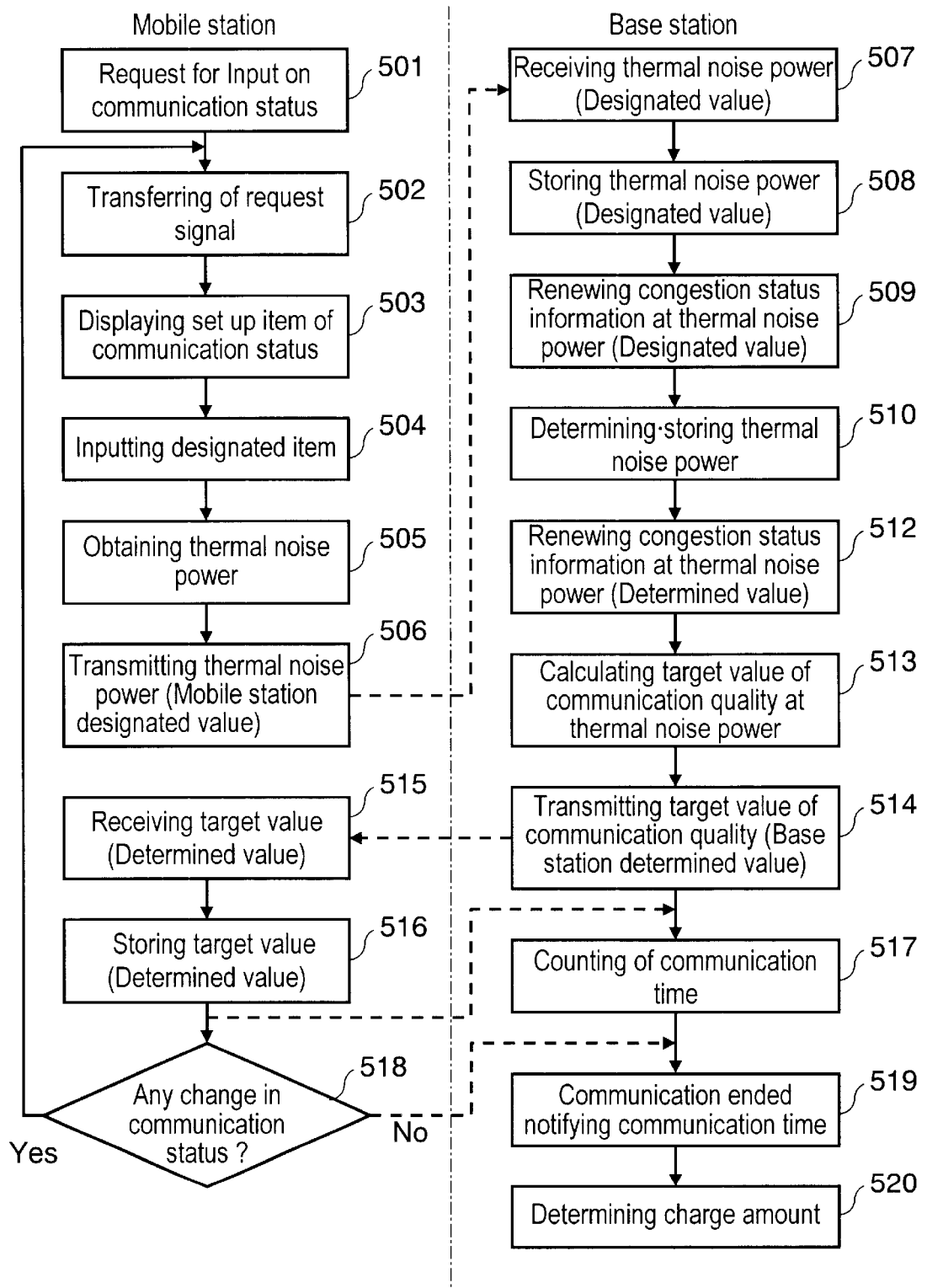
FIG. 7 is a flow chart of a communication method according to a communication system in another exemplary embodiment of the present invention.
Figure 8:
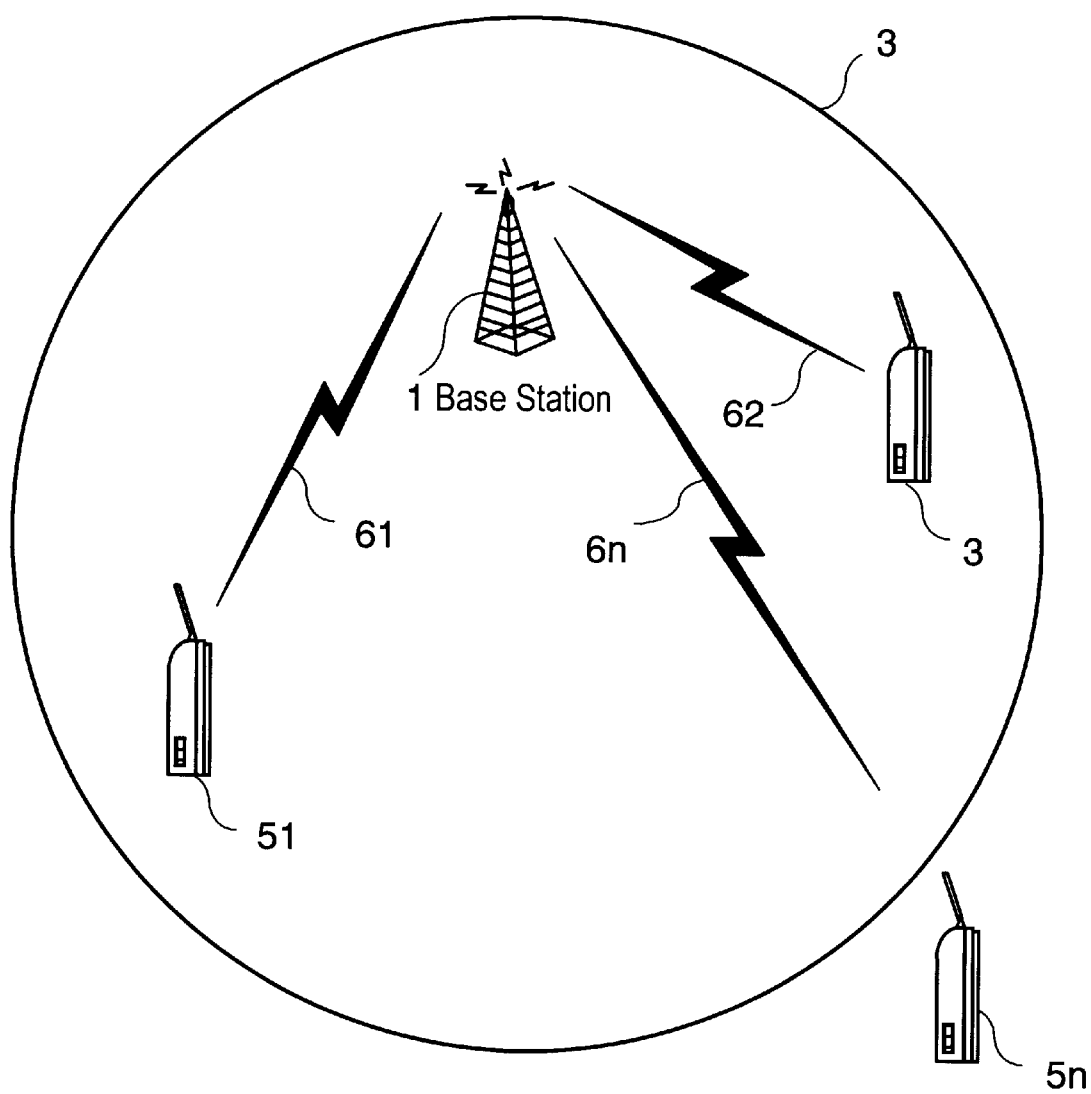
FIG. 8 is a diagrammatic sketch of a communication zone of a prior art communication system.

FIG. 7 shows briefly a flow chart of another example of a communication method in the foregoing communication system. A description is given to wireless communications in the communication system of the on-going invention with reference to FIG. 1 to FIG. 5 and FIG. 7, and the description is given, in particular, to a case where, while a target value of communication quality being arbitrarily designated at the side of the mobile station 20, the wireless communications are performed optimally.

First, the user 10 inputs a request signal for setting up or changing a communication status via the input device 26 of the mobile station 20 such as a portable telephone and the like. (501) This request signal is sent to the CPU 211 via the I/O.IF 215 of the controller 21. (502) The CPU 211 controls a communication status determining program of the ROM 212 according to the request signal and displays a communication status determining item on the display panel 25. (503) As the communication status determining items, there are such items as an upper limit p [mW] of transmitting power at the base station side, an upper limit p' [mW] of transmitting power at the mobile station side, a transferring speed v [bps] of a signal sent from the base station side, a transferring speed v' [bps] of a signal sent from the mobile station side, communication quality q between the mobile station 20 and the base station 30, a charge rank m and the like. The user 10 selects an arbitrary item from the communication status determining items displayed on the display panel 25 and inputs a value for the selected item as a designated item via the input device 26. (504) In addition, the selected designated item can be stored in the memory 21c (RAM 213).

Next, a description is given to a case where the inputted designated item is a target value q of communication quality. In this case, the communication status item designating block 21a of the controller 21 sends the inputted target value q of communication quality to the communication status item converting block 21b, where the target value q of communication quality is converted to thermal noise power n [μW] between the base station 30 and the mobile station 20. (505) This value may also be obtained by referring to a table of the relation between the target value q of communication quality and the thermal noise power n, for example, prepared beforehand in the memory 21c (ROM 212). Also, the relation between the target value q of communication quality and the thermal noise power n is arranged so as to be expressed by a predetermined mathematical model 6 as below, for example:

Mathematical Model 6

$$n=\alpha\cdot q$$

(The $\alpha$ is a constant, where $0<\alpha$.)

The thermal noise power n is also allowed to be derived from the mathematical model 6.

Then, the thermal noise power n obtained as in above is storred in the memory 21c (RAM 213) in the controller 21 and at the same time transferred to the transmitting circuit 23, where the thermal noise power n is transmitted to the base station 30 via the antenna 24. (506)

The base station 30 receives the thermal noise power n from the mobile station 20 via the antenna 34 at the receiving circuit 32. (507) The received thermal noise power n is stored in the RAM 313 (memory 31c) via the I/O.IF 315 of the controller 31. (508) Further, the thermal noise power n (a mobile station designated value) received from respective mobile stations engaged in communication and stored in the memory 31c (RAM 313) is put together at the communication congestion status detector 31e and stored in the memory 31c (RAM 313) as communication congestion status information n0 (n0=Σn). (509)

The communication status determining block 31a of the controller 31 of the base station 30 determines thermal noise power N (a base station determined value) from the thermal noise power n of the mobile station 20, and the communication congestion status information n0 stored in the memory 31c (RAM 313) or N0 that is described later, and stores the thermal noise power N in the memory 31c (RAM 313). (510) The thermal noise power N determined for each respective mobile station is combined at the communication congestion status detector 31e to obtain communication congestion status information N0 (N0=ΣN), which is stored in the memory 31c (RAM 313), (512) thereby making N0 available in Step 510 of the foregoing.

The communication status item converting block 31b of the controller 31 of the base station 30 derives a target value Q of communication quality from the thermal noise power N (a base station determined value) stored in the memory 31c (RAM 313) by conversion and stores the target value Q of communication quality in the memory 31c (RAM 313). (513) This is performed by a reversed process against Step 505 of above. The target value Q of communication quality thus obtained is sent to the mobile station 20 by the communication controller 31d from the transmitting circuit 33 via the antenna 34. (514)

At the mobile station 20, the target value Q of communication quality is received by the receiving circuit 22 via the antenna 24. (515) This target value Q of communication quality is stored in the memory 21c (RAM 213) via the I/O.IF 215 of the controller 21. (516)

The communication controller 31d of the base station 30 counts time t of communication exchanged with the mobile station 20 and maintains the time t. (517) When a request for setting up again or changing the target value q of communication quality is inputted from the user 10 while being engaged in communication (518), the process of Step 502 to Step 516 is repeated. The communication controller 31d of the base station 30 informs the charge calculating device 41 of the target value Q of communication quality and time t of communication upon finishing communications. (519) At this time, when the target value Q of communication quality is changed halfway, an arrangement is made to inform the time of communication for each respective target value of communication quality. The charge calculating block 41 determines an amount of charge M according to the target value Q of communication quality and time of communication. (520) The amount of charge M is allowed also to be determined according to a mathematical model 7 of below, for example:

Mathematical Model 7

$$M = k \cdot Q \cdot t$$

(The k is a predetermined constant.)

This mathematical model 7 can also be stored in advance in the charge calculating block 41 of the base station 30 and also the mathematical model 7 is stored in the memory 31c (RAM 313) of the controller 31 for obtaining the amount of charge M by calculation at the communication controller 31d. The amount of charge M thus obtained can be collected from the user 10.

In the foregoing, one example of the communication method in the communication system of the on-going invention is briefly described and the communication congestion status information n0 and N0 need not be considered in Step (510) where the thermal noise power N (a base station determined value) is determined.

Also, by converting the target values q and Q of communication quality to the upper limit p of transmitting power at the communication status item converting block 21b of the mobile station 20 or the communication status item converting block 31b of the base station 30, the processing of FIG. 6 can be performed. In this case, the target value Q of communication quality is also allowed to be determined according to a mathematical model 8 as follows:

Mathematical Model 8

$$Q = k \cdot q$$

(The k is a constant, where $0 < k \leq 1$.)

Also, when the relation between the on-going thermal noise power (N=Nc) and the thermal noise power n sent from the mobile station 20 is expressed by an inequality of $n \leq Nc$, i.e., the on-going thermal noise power Nc is requested to be lowered, the communication status determining block 30a of the base station 30 may immediately have the on-going thermal noise power Nc renewed to the thermal noise power n that has been received. (N=n)

Also, a threshold value N1 of the summation of thermal noise power is once stored in the memory 31c (RAM 313) and the relations between the communication congestion status information N0, on-going thermal noise power Nc and thermal noise power n sent from the mobile station 20 may be checked at the communication status determining block 31a as follows: In case where N0−Nc+n (the summation of the thermal noise power after renewal) exceeds N1 (the threshold value of the summation of thermal noise power) (NO−Nc+n>N1), controlling can be performed so as to maintain the on-going thermal noise power N=Nc as is without applying any change thereto. Also, the thermal noise power N can be made equal to the maximum allowable value, i.e., N=N1−(NO−Nc). Further, the thermal noise power n is made to satisfy an inequality, NO−Nc+n≦N1, by lowering the thermal noise power of other mobile stations than the mobile station 20 being engaged in communication, and the mobile station designated value n as is maybe used as the base station determined value N.

The threshold value N1 may also be used as an upper limit N2 of thermal noise power of the base station 30. Further, a value N1' that is derived by correcting the upper limit N2 according to spontaneously generated thermal noise power N3 is allowed to be used as a threshold value. (N'=N2−N3) Accordingly, controlling can be performed at the communication status determining block 31a in such a way that the communication congestion status information N0 may not exceed the upper limit N2 or the corrected value N1' at all times.

In the foregoing, the communication congestion status detector 31e may also make the communication congestion status information as the summation n0 of the mobile station designated value n in place of the summation N0 of the base station determined value N. In this case, the communication status determining block 31a may be better controlled in such a way as the relation between N and n0 may satisfy a mathematical model 9 as follows:

Mathematical Model 9

$$N0 = N1' \times \{1 - \exp(-n0/N1')\},$$

where the N1' is a corrected threshold value of the summation of thermal noise power as described in the above.

In the foregoing, a description is given to a communication method in the communication system of the present invention, and although in Step 509 and Step 512 of FIG. 7 the communication congestion status information is made the summation of thermal noise power N or n, it can be also made the summation of a target value q or Q of communication quality in a straightforward manner.

In Step 505 of FIG. 7, instead of gaining the thermal noise power n from the target value q of communication quality at the communication status item converting block 21b of the mobile station 20, the target value q of communication quality may also be converted to the thermal noise power n at the communication status item converting block 31b of the controller 31 at the base station 30 by transmitting the target value q of communication quality to the base station 30. In this case, the table and mathematical model 6 as described in the above are arranged beforehand to be stored in the memory 31c (ROM 313) of the controller 31 at the base station 30.

By designating both of the upper limits p and p' of transmitting power as FIG. 6 shows and the target value q of communication quality as FIG. 7 shows, the communication status of the communication system of the present invention can also be determined. In this case, communication controlling as described below can also be performed.

First, a quality value q2 of communication exchanged with the mobile station 20 is detected at the communication controller 31d of the controller 31 at the base station 30. The communication controller 31d transmits a signal at the upper limit P of communication power and also, when the communication quality q2 falls short of the target value Q of communication quality, the information to that effect is sent to the mobile station 20 from the transmitting circuit 33.

Upon receiving the information at the receiving circuit 22, the mobile station 20 performs a communication controlling process in the communication controller 21d. The controlling process mentioned here includes, for example, a controlling process to terminate communications with the base station 30, or a controlling process to send to the base station 30 a new upper limit p1 of transmitting power that is larger than the on-going upper limit P of transmitting power, or a controlling process to send to the base station 30 a new target value of communication quality that is lower than the on-going target value Q of communication quality, or a controlling process to send to the base station 30 both the new upper limit p1 of transmitting power that is larger than the on-going upper limit P of transmitting power and the new target value q1 of communication quality that is lower than the on-going target value Q of communication quality, or the like. In this case, Step 407 and thereafter of FIG. 6 and Step 507 and thereafter of FIG. 7 are arranged to be executed according to the upper limit p1 and target value q1 at the base station 30.

Also, the communication controller 31d of the controller 31 at the base station 30 detects a value q3 of communication quality of a signal that is being sent from the mobile station 20. The communication controller 31d sends this communication quality q3 to the mobile station 20 from the transmitting circuit 33. The communication controller 21d of the controller 21 in the mobile station 20 performs a communication controlling process when communications with the base station 30 are performed at the upper limit P' of transmitting power and also the value q2 of communication quality is judged as being lower than the target value Q of communication quality. This controlling process includes, for example, a controlling process to terminate communications with the base station 30, or a controlling process to send to the base station 30 a new upper limit p1' of transmitting power of the mobile station 20 that is larger than the on-going upper limit P' of transmitting power of the mobile station 20, or a controlling process to send to the base station 30 a new target value q1 of communication quality that is lower than the on-going target value Q of communication quality, or a controlling process to send to the base station 30 both of the new upper limit p1' of transmitting power of the mobile station 20 that is larger than the on-going upper limit P' of transmitting power of the mobile station 20 and the new target value q1 of communication quality that is lower then the on-going target value Q of communication quality, or the like. In this case, Step 407 and thereafter of FIG. 6 and Step 507 and thereafter of FIG. 7 are arranged to be executed according to the upper limit p1' and target value q1' at the base station 30.

With the communication system and communication method of the present invention as described in the above, the processing can also be performed by converting the target values q and Q of communication quality, instead of the thermal noise power n and N, to a reciprocal of bit error rate (BER) per unit time, a ratio of signal power after back-diffusion to thermal noise power or a ratio of signal power per bit to noise power density.

The communication system and communication method of the present invention can also applied to spread spectrum communications. Here, the processing can also be performed by converting the target values q and Q of communication quality to a ratio Qs of signal power after back-diffusion to thermal noise power or a ratio Qs' of signal power per bit to noise power density and a spread ratio R of spread spectrum communications. The thermal noise power n can be derived from a mathematical model 10 as follows:

Mathematical Model 10

$$n = k \cdot (Qs/R)$$

or $$n = k' \cdot (Qs'/R)$$

(The k and k' are constants.)

Further, the spread spectrum communications can also be replaced with CDMA (Code Division Multiple Access) communications.

As described in the above, according to the communication method and communication system of the present invention, such communication conditions for wireless communications as an upper limit of transmitting power, a transferring speed of a signal, a target value of communication quality and the like can be arbitrarily designated for a base station and also for a mobile station at the mobile station side and, therefore, it has become possible for communication conditions to be established optimally according to the nature of information sent by the user and the communication environment involved.

In addition, by detecting and watching the communication congestion status, the on-going communication status can be grasped correctly, thereby enabling the proper and maximum utilization of a base station's communication ability. Also, by having the communication congestion status grasped under the same conditions as communication conditions such as an upper limit of transmitting power, a transferring speed, a target value of communication quality and the like relative to controlling communications with mobile stations, easy, proper and maximum utilization of the communication ability of a base station has become possible.

Furthermore, since a target value of communication quality can be converted to thermal noise power, a reciprocal of bit error rate (BER) per unit time, a ratio of signal power after back-diffusion to thermal noise power or a ratio of signal power per bit to noise power density, an optimum selection of criteria for communication quality as needs require has become possible in accordance with the communication system and the environment involving the communication facilities.

Since communication fees are charged according to the communication conditions designated at the mobile station side, it has become possible for the user to set up the communication conditions and costs optimally.

What is claimed:

1. A communication method for performing wireless communications between a base station and a plurality of mobile stations, comprising steps of:

(a) designating arbitrarily an upper limit p of transmitting power of a signal transmitted from the base station at a mobile station; and (b) transmitting the designated upper limit p of transmitting power to the base station at the mobile station, and (c) receiving the upper limit p of transmitted power transmitted from said mobile station at the base station;

(c') monitoring at the base station a communication congestion status of mobile stations engaged in communication, and (d) determining at the base station an upper limit P of transmitting power of the base station against said mobile station according to said communication congestion status and said upper limit p, wherein said step (c') is to monitor a communication congestion status against a mobile station engaged in communication according to a summation of an upper limit p of communication power designated by a mobile station engaged in communication.

2. A communication method a for performing wireless communications between a base station and a plurality of mobile stations, comprising steps of:

(a) designating arbitrarily an upper limit p of transmitting power of a signal transmitted from the base station at a mobile station; and (b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit p, wherein said step (d) is to determine an upper limit P of transmitting power of the base station against said mobile station according to said upper limit p so as to satisfy an equation of $P=k \cdot p$, where $0 < k \leq 1$.

3. A communication method for performing wireless communications between a base station and a plurality of mobile stations, comprising steps of:

(a) designating arbitrarily an upper limit p of transmitting power of a signal transmitted from the base station at a mobile station and b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit p, wherein said step (d) is to adopt the upper limit P of transmitting power of the base station against said mobile station as said upper limit p when said upper limit p is smaller than an upper limit of transmitting power used in communications with said mobile station.

4. A communication method for performing wireless communications between a base station and a plurality of mobile stations, comprising steps of:

(a) designating arbitrarily an upper limit p of transmitting power of a signal transmitted from the base station at a mobile station and (b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit p, in communications with said mobile station in case where a summation of an upper limit of transmitting power of the base station against a mobile station engaged in communication exceeds a predetermined threshold value when the upper limit P of transmitting power used in communications with said mobile station is being changed to said upper limit p.

5. A communication method as for performing wireless communications between a base station and a plurality of mobile stations, comprising steps of:

(a) designating arbitrarily an upper limit p of transmitting power of a signal transmitted from the base station at a mobile station; and (b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit p, station against a mobile station engaged in communication does not exceed the predetermined threshold value, when the upper limit P of transmitting power used in communications with said mobile station is about to be changed to said upper limit p.

6. The communication method according to claim 4 further comprising at said base station a step (e) of transmitting a signal for maintaining the upper limit P of transmitting power from said base station to said mobile station when the upper limit P of transmitting power used in communications with said mobile station is maintained in said step (d).

7. A communication method for performing wireless communications between a base station and a plurality of mobile stations, comprising steps of:

(a) designating arbitrarily an upper limit p of transmitting power of a signal transmitted from the base station at a mobile station and (b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit p, said upper limit p in case where a summation of an upper limit of transmitting power of the base station against a mobile station engaged in communication exceeds a predetermined threshold value when the upper limit P of transmitting power used in communications with said mobile station is about to be changed to said upper limit p.

8. The communication method according to claim 4, wherein said threshold value is the maximum value of communication power available as an output from said base station.

9. A communication method for performing wireless communications between a base station and a plurality of mobile stations, comprising steps of:
   (a) designating arbitrarily an upper limit p of transmitting power of a signal transmitted from the base station at a mobile station; and
   (b) transmitting the designated upper limit p of transmitting power to the base station at the mobile station, and
   (c) receiving the upper limit p of transmitting power transmitted from said mobile station at the base station;
   (d) determining at the base station an upper limit P of transmitting power of the base station against said mobile station according to said upper limit p and
   (e) of transmitting a renewal signal for the upper limit p from said base station to said mobile station in said step
   (d) where the upper limit of transmitting power used in communications with said mobile station is renewed.

10. A communication method for performing wireless communications between a base station and a plurality of mobile stations, comprising steps of:
    (a) designating arbitrarily an upper limit p of transmitting power of a signal transmitted from the base station at a mobile station and
    (b) transmitting the designated upper limit p of transmitting power to the base station at the mobile station and
    (c) receiving the upper limit p of transmitting power transmitted from said mobile station at the base station; and
    (d) determining at the base station an upper limit P of transmitting power of the base station against said mobile station according to said upper limit, wherein:
    said step (a) is to designate arbitrarily an upper limit p of transmitting power transmitted from the base station and an upper limit p' of transmitting power of a signal transmitted from said mobile station; said step
    (b) is to transmit the respective designated upper limits p and p' of transmitting power to the base station; said step
    (c) is to receive the respective upper limits p and p' of transmitting power transmitted from said mobile station; and said step
    (d) is to determine an upper limit P of transmitting power of the base station against said mobile station according to said upper limit p and upper limit P' of transmitting power of said mobile station according to said upper limit p'.

11. The communication method according claim 10, further comprising steps of:
    (e) transmitting the determined mobile station's upper limit P' of transmitting power to said mobile station at said base station; and
    (b') transmitting a signal with a value Pp' of transmitting power not exceeding the determined upper limit P' of transmitting power to said base station at said mobile station.

12. A communication method, a step for performing wireless communications between a base station and a plurality of mobile stations, comprising steps of:
    (a) designating arbitrarity an upper limit p of transmitting power of a signal transmitted from the base station at a mobile station and
    (b) transmitting the designated upper limit p of transmitting power to the base station at the mobile station and
    (c) receiving the upper limit p of transmitting power transmitted from said mobile station at the base station;
    (d) determining at the base station an upper limit P of transmitting power of the base station against said mobile station according to said upper limit p; and
    (e) transmitting a signal with a value Pp of transmitting power not exceeding the determined upper limit P of transmitting power to said mobile station at said base station.

13. A communication method for performing wireless communications between a base station and a plurality of mobile stations, comprising steps of:
    (a) designating arbitrarily an upper limit p of transmitting power of a signal transmitted from the base station at a mobile station and
    (b) transmitting the designated upper limit p of transmitting power to the base station at the mobile station, and
    (c) receiving the upper limit p of transmitting power transmitted from said mobile station at the base station;
    (d) determining at the base station an upper limit P of transmitting power of the base station against said mobile station according to said upper limit p; and
    (e) determining a fee amount charged to said mobile station according to the base station's upper limit P of transmitting power against said mobile station at said base station.

14. The communication method according to claim 12, further comprising a step (f) of determining a fee amount charged to said mobile station according to an actual value Pp of transmitting power against said mobile station at said base station.

15. The communication method according to claim 10, further comprising a step (e) of determining a fee amount charged to said mobile station according to the upper limit P' of transmitting power of said mobile station at said base station.

16. The communication method according to claim 11, further comprising a step (f) of determining a fee amount charged to said mobile station according to an actual value Pp' of transmitting power of said mobile station at said base station.

17. The communication method according to claim 10, wherein:
    said step (a) is to designate arbitrarily a transferring speed v' instead of said upper limit p';
    said step (b) is to transmit the designated transferring speed v' to the base station instead of said upper limit p'; and
    said step (c) is to receive the transmitted transferring speed v' transmitted from said mobile station and convert the upper limit p' of transmitting power of said mobile station according to said transferring speed v'.

18. A communication method for performing wireless communications between a base station and a plurality of mobile stations, comprising steps of:

(a) designating arbitrarily an upper limit p of transmitting power of a signal transmitted from the base station at a mobile station; and (b) transmitting the designated upper limit p of transmitting power to the base station at the mobile station, and (c) receiving the upper limit p of transmitting power transmitted from said mobile station at the base station; and (d) determining at the base station an upper limit P of transmitting power of the base station against said mobile station according to said upper limit, wherein:
   said step (a) is to designate arbitrarily a transferring speed v instead of said upper limit p;
   said step (b) is to transmit the designated transferring speed v to the base station instead of said upper limit p; and said step (e) is to receive the transmitted transferring speed v transmitted from said mobile station and convert the upper limit p of transmitting power of said base station according to said transferring speed v.

19. The A communication system comprising a base station and a plurality of mobile stations and performing wireless communications between said base station and said plurality of mobile stations, wherein each respective mobile station of said plurality of mobile stations has:

a transmitting power designating means to designate an upper limit p of transmitting power for a signal transmitted from said base station; and a transmitting means to transmit said upper limit p designated by said transmitting power designating means to said base station, and said base station has:
   a receiving means to receive said upper limit p of transmitting power transmitted from said mobile station;
   a transmitting power determining means to determine an upper limit P of transmitting power at the time of transmitting a signal to said mobile station according to said upper limit p;
   communication congestion status detecting means to detect a communication congestion status of a mobile station engaged in communication among said plurality of mobile stations; and
   said transmitting power determining means determines the upper limit P of transmitting power according to the communication congestion status detected by said communication congestion status detecting means when a signal is transmitted to said mobile station.

\* \* \* \* \*